United States Patent
Reymann et al.

(10) Patent No.: US 9,184,474 B2
(45) Date of Patent: Nov. 10, 2015

(54) RECHARGEABLE BATTERY UNIT AND PORTABLE ELECTRONIC APPLIANCE

(75) Inventors: Dirk Reymann, Hambühren (DE); Elmar Schulze, Lehrte (DE); Niels Christian Steen Hansen, Slangerup (DK); Dirk Krätzer, Hannover (DE)

(73) Assignee: Sennheiser electronic GmbH & Co. KG, Wedemark (DE)

( * ) Notice: Subject to any disclaimer, the term of this patent is extended or adjusted under 35 U.S.C. 154(b) by 640 days.

(21) Appl. No.: 13/131,737

(22) PCT Filed: Nov. 20, 2009

(86) PCT No.: PCT/EP2009/065557
§ 371 (c)(1),
(2), (4) Date: Sep. 12, 2011

(87) PCT Pub. No.: WO2010/063594
PCT Pub. Date: Jun. 10, 2010

(65) Prior Publication Data
US 2012/0062169 A1    Mar. 15, 2012

(30) Foreign Application Priority Data

Dec. 1, 2008  (DE) .......................... 10 2008 059 760
Apr. 8, 2009  (DE) .......................... 10 2009 016 497

(51) Int. Cl.
*H01M 10/46*    (2006.01)
*H02J 7/00*    (2006.01)

(52) U.S. Cl.
CPC .............. *H01M 10/46* (2013.01); *H02J 7/0011* (2013.01)

(58) Field of Classification Search
CPC ........................................................ H02J 7/0042
USPC .............................................. 320/107; 429/99
See application file for complete search history.

(56) References Cited

U.S. PATENT DOCUMENTS

| | | | | |
|---|---|---|---|---|
| 6,020,085 | A * | 2/2000 | Towle | 429/96 |
| 6,430,813 | B2 * | 8/2002 | Muraguchi et al. | 30/43.92 |
| 6,483,273 | B1 * | 11/2002 | Lee | 320/111 |
| 7,146,667 | B2 * | 12/2006 | Elsener | 7/118 |
| 7,223,494 | B2 * | 5/2007 | Takeshita et al. | 429/123 |
| 2005/0212479 | A1 | 9/2005 | Tsunoda | |
| 2005/0213297 | A1 * | 9/2005 | Ulla et al. | 361/683 |
| 2005/0280398 | A1 | 12/2005 | Lee et al. | |
| 2006/0267547 | A1 * | 11/2006 | Godovich | 320/107 |
| 2007/0037048 | A1 * | 2/2007 | Takeshita et al. | 429/99 |
| 2007/0037049 | A1 * | 2/2007 | Iijima et al. | 429/99 |
| 2008/0166007 | A1 * | 7/2008 | Hankey et al. | 381/380 |
| 2008/0224659 | A1 * | 9/2008 | Singh | 320/114 |

FOREIGN PATENT DOCUMENTS

| | | |
|---|---|---|
| EP | 1 548 911 | 6/2005 |
| EP | 1 610 438 | 12/2005 |

OTHER PUBLICATIONS

International Search Report for Application No. PCT/EP2009/065557 dated Feb. 10, 2010.

* cited by examiner

*Primary Examiner* — Samuel Berhanu
*Assistant Examiner* — Jerry D Robbins
(74) *Attorney, Agent, or Firm* — Frommer Lawrence & Haug LLP

(57) ABSTRACT

There is provided an accumulator unit for insertion into a portable electronic device. The accumulator unit has an integrated charging unit and a charging port. The charging port is freely accessible in the inserted and non-inserted condition of the accumulator unit.

10 Claims, 3 Drawing Sheets

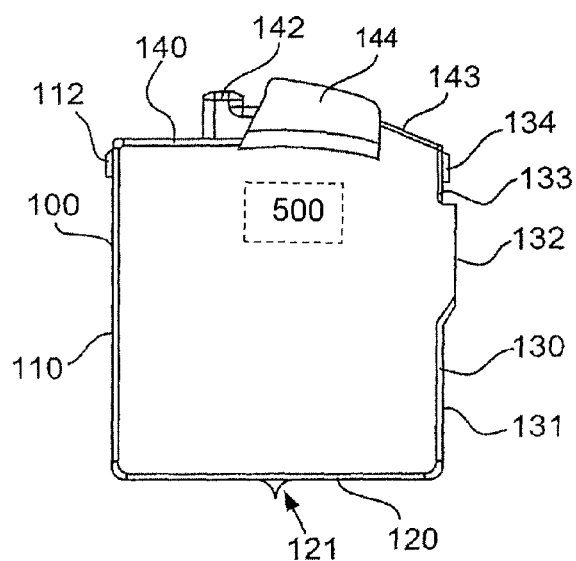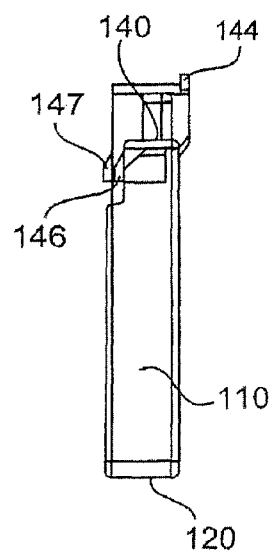
Fig. 1A  Fig. 1B
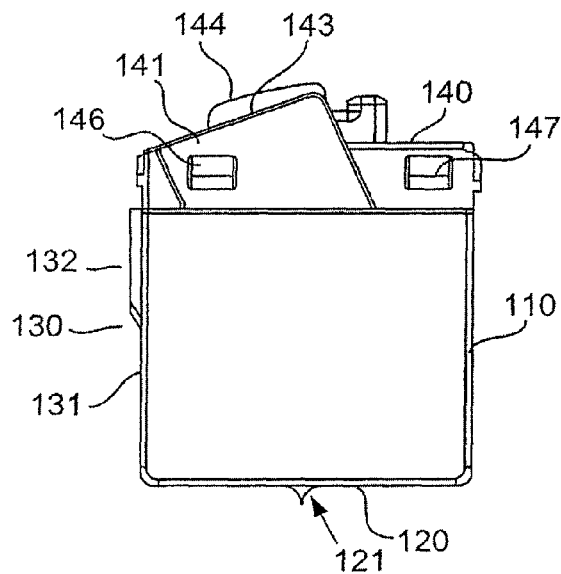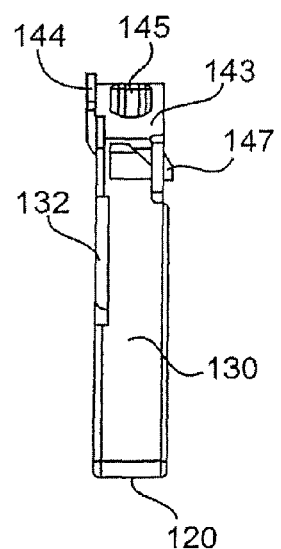
Fig. 1C  Fig. 1D

RECHARGEABLE BATTERY UNIT AND PORTABLE ELECTRONIC APPLIANCE

The present application claims priority from PCT Patent Application No. PCT/EP2009/065557 filed on Nov. 20, 2009, which claims priority from German Patent Application Nos. DE 10 2008 059 760.0 filed on Dec. 1, 2008, and DE 10 2009 016 497.9 filed on Apr. 8, 2009, the disclosures of which are incorporated herein by reference in their entirety.

BACKGROUND OF THE INVENTION

1. Field of the Invention

The present invention concerns an accumulator unit and a portable electronic device.

2. Description of Related Art

Portable electronic devices require a battery or a rechargeable accumulator for the power supply. In that respect, both devices in which the accumulators have to be removed from the electronic device to be recharged and also electronic devices in which the accumulator unit is provided fixedly in the device and the accumulator is charged in the installed condition are known.

SUMMARY OF THE INVENTION

An object of the present invention is to provide an accumulator unit and a portable electronic device which permits simpler charging.

Thus there is provided an accumulator unit for insertion into a portable electronic device. The accumulator unit has an integrated charging unit and a charging port. The charging port is freely accessible in the inserted and non-inserted condition.

Thus the accumulator unit can be directly charged both in the uninstalled and also in the inserted condition.

In an aspect of the invention the charging port represents a standardised micro USB port for a micro USB plug.

In a further aspect of the invention the accumulator unit is of a substantially cuboidal configuration and has a top side, an underside, first and second side walls, a front side and a rear side.

In a further aspect of the invention the area of the top side or the underside is at least twice as large as the area of the first or second side wall.

Thus there is provided an accumulator unit which is of a relatively shallow configuration and can thus be well inserted into portable electronic devices.

In a further aspect of the invention the rear side has a first and a second contact surface for providing an electric voltage to the respective ends of the rear side.

Thus it is possible to achieve good insulation of the contact surfaces as they are far apart from each other. In addition the risk of soiling can be reduced.

In a further aspect of the invention the rear side optionally has a nose substantially centrally.

Thus it is possible to improve insulation between the first and second contact surfaces. In addition positionability of the contact surfaces can be further improved. That can be effected in particular when there is a corresponding recess in the electronic device. In addition it is possible in that way to prevent the accumulator unit from wobbling in the electronic device.

In a further aspect of the invention the accumulator unit has at the top side at least one nose which can optionally serve for latching engagement of the accumulator unit in a receiving unit of the electronic device.

In a further aspect of the invention the front side has a projection arranged at an angle of between 5° and 45° relative to the rear side.

In a further aspect of the invention the accumulator unit has a guide rail at the first or second side wall.

The invention concerns the idea of providing an electronic unit with an integrated electronic charging arrangement and a charging port. The charging port can be directly reached both in the installed and in the uninstalled condition so that a suitable charging cable can be readily connected in order to charge up the accumulator at any time (including in the inserted condition) by inserting a plug of a charging cable into the charging port. That is particularly advantageous as no further device is required for charging up the accumulator.

The configuration of the charging port and the outside dimensions of the accumulator unit in conjunction with the dimensions of the receiving unit are so selected that the force required to remove the plug of the charging cable from the charging port is greater than the force required to hold the accumulator unit in the receiving unit. In that way for example the accumulator unit can be pulled out of the receiving compartment at the charging cable if the plug of the charging cable is inserted into the charging port.

The charging port can optionally be in the form of a standardised micro USB port.

Further configurations of the invention are subject-matter of the appendant claims.

BRIEF DESCRIPTION OF THE DRAWINGS

FIGS. 1A through 1G show various views of an accumulator unit in accordance with a first embodiment.

DETAILED DESCRIPTION OF EMBODIMENTS

Figure 1E:
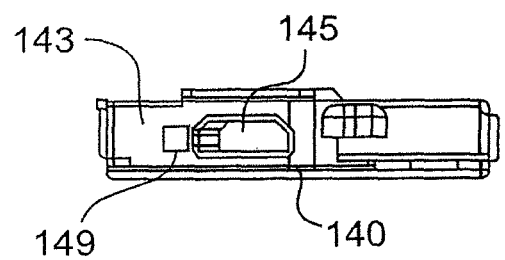

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

FIGS. 1A through 1G show various views of an accumulator unit for a portable electronic and/or electrical device in accordance with a first embodiment.

FIG. 1A shows a first plan view of an accumulator unit 100 in accordance with the first embodiment. The accumulator unit has a housing having a first and a second side surface 110, 130, a rear side 120 and a front side 140. The accumulator unit can further have a power storage means for storing electrical power.

In the region of the transition between the first side surface 110 and the front side 140 the first side surface 110 has a first projection 112. A nose 121 can optionally be provided centrally in the region of the rear side 120. The second side surface 130 has a first projection 132 and a second projection 134. The front side 140 has an inclinedly arranged first surface 143. A charging port 145 can be provided in that first inclinedly arranged surface 143. An elongate projection 144 can optionally be provided at an underside of the accumulator unit.

FIG. 1B shows a side view of the accumulator unit of FIG. 1A. In the region of the front side 140 the accumulator unit has first and second projections 146, 147.

FIG. 1C shows a plan view of the top side of the accumulator unit of FIG. 1A. The second side surface 130 has a projection 132. Two projections 146, 147 are provided in the region of the front side 140. A surface 141 extends inclinedly with respect to the front side 140.

FIG. 1D shows a further side view of the accumulator unit of FIG. 1A. An elongate projection 132 is provided at the second lateral surface 130. A projection 147 is provided in the region of the front side 140. An insertion opening for the charging port is further provided in the region of the front side 140.

FIG. 1E shows a plan view of the front side 140 of the accumulator unit of FIG. 1A. The insertion opening 145 can be seen there. The accumulator unit can optionally have a light emitting diode LED 149 at the front side 140. The light emitting diode can serve to display a charging condition of the accumulator unit. For example the diode can be lit red when the accumulator unit is being charged. The diode can further be lit green when the accumulator unit is charged up.

The light emitting diode 149 can also be used to display the charging condition of the accumulator unit. For example the diode can be lit red or can flash red if the charging condition of the accumulator unit has fallen below a given threshold value.

Figure 1F:
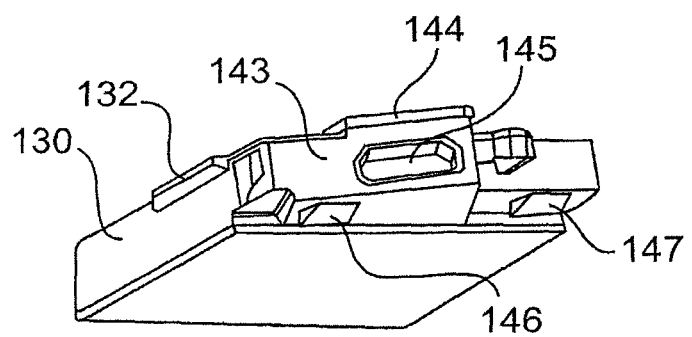

FIG. 1F shows a perspective view of the accumulator unit of FIG. 1A. In this case it is possible to see in particular the front side 140 and the second side surface 130. An elongate projection 132 is optionally provided at the second lateral surface 130. Two projections 146, 147 are provided on the top side of the accumulator unit. An insertion opening 145 and an elongate projection 144 are provided at the front side 140.

Figure 1G:
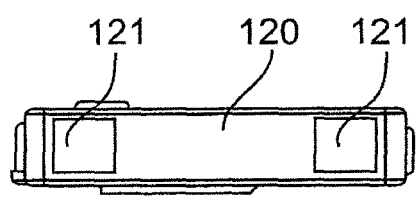

FIG. 1G shows a side view of the rear side of the accumulator unit. Two electronic contacts 121 are provided at the rear side 120.

The accumulator unit in accordance with the first embodiment has a housing, a storage means for the storage of electrical power, an integrated charging unit 500 for controlling charging of the electrical storage means and a freely accessible charging port.

The accumulator unit shown in FIGS. 1A through 1G can be of a thickness of between 6 and 7 mm, for example 6.25 mm, at the rear side 120, and a thickness of for example 6.5-7.5, preferably 7.1 mm, at the front side. The length of the accumulator unit between the rear side 120 and the elongate projection 144 can be between 37-39 mm, for example 38.2 mm. The width of the accumulator unit at the rear side 120 can be for example 29 mm. The width of the accumulator unit at the front side 140 can be between 30 and 31, for example 30.6 mm. The first side surface 110 can be of a width of between 28 and 30 mm, preferably 29 mm, and a length of between 25 and 27 mm, preferably 26.4 mm.

In an embodiment of the invention the accumulator unit has a ratio of the overall length to the thickness of the rear side of between 6 and 7. The ratio of the overall length to the width of the rear side can be a ratio of between 1 and 1.8, preferably 1.3. The ratio of the width of the rear side 120 to the thickness of the rear side can be between 4 and 5 and preferably 4.6.

Figure 2A:
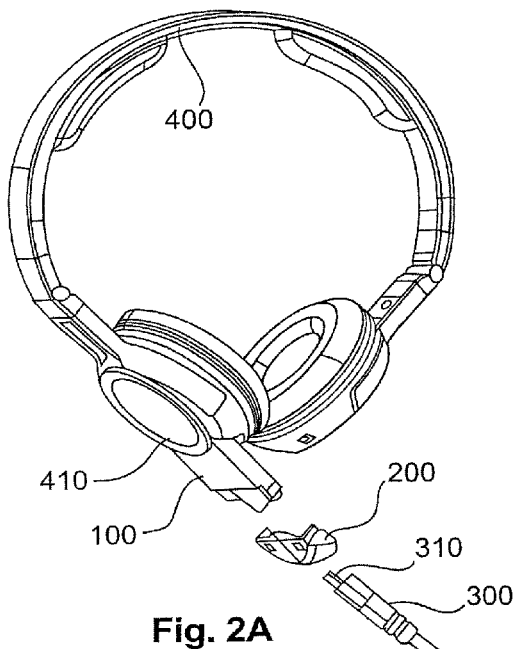
FIGS. 2A through 2C show various views of headphones in accordance with a second embodiment.
Figure 2B:
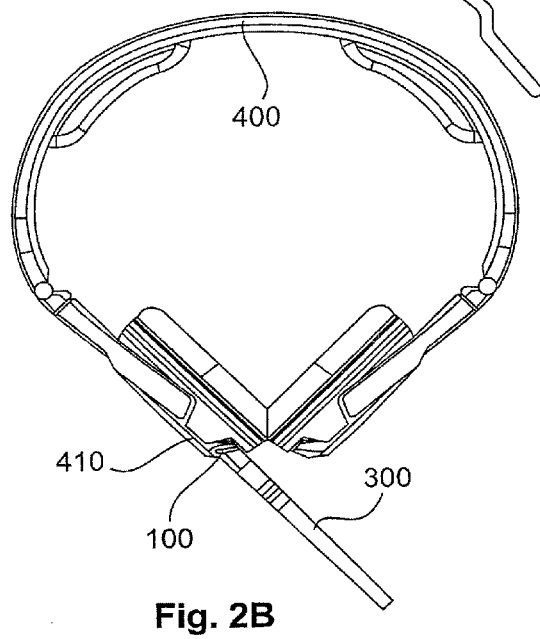
Figure 2C:
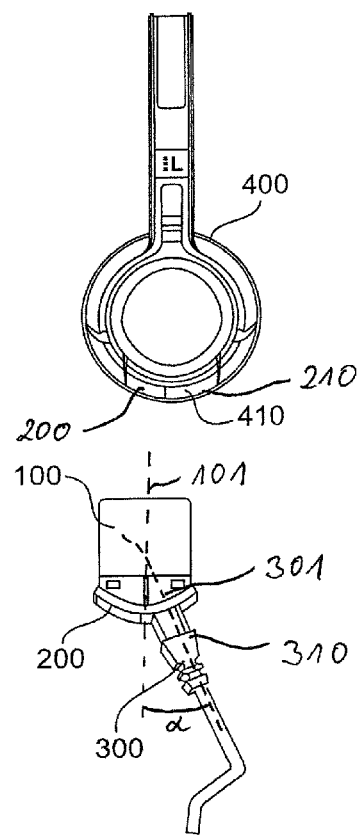

FIGS. 2A through 2C show various views of headphones in accordance with a second embodiment.

FIG. 2A shows a diagrammatic view of headphones 400 in accordance with a second embodiment, an accumulator unit 100 for example in accordance with the first embodiment, a cap 200 and a charging cable 300. The accumulator unit can be inserted into a receiving compartment 410 of the headphones so that the electrical connections 121 at the rear side 120 of the accumulator unit are coupled to corresponding electrical connections in the headphones. Then a cap 200 can be pushed over the front side of the accumulator unit so that the accumulator unit is concealed in the inserted condition and only a charging port is freely accessible so that a charging cable 300 for example with a micro USB connection or plug can be inserted into the charging port.

FIG. 2B shows a diagrammatic view of the headphones in accordance with the second embodiment, wherein both the accumulator unit 100 is received in the housing of the headphones and the accumulator unit 100 is coupled to a charging cable 300.

FIG. 2C shows a side view of headphones according to the second embodiment and an accumulator unit 100 with the cap 200 and the charging cable 300. In this case the accumulator unit can be inserted into the opening 410 in the housing of the headphones.

The receiving compartment 410 can have a groove for receiving the elongate projection 132. The receiving compartment 410 can further have recesses for receiving the projections 146, 147.

The accumulator unit shown in FIGS. 1A through 1G can also be used in other portable electronic devices.

The accumulator unit according to the invention can represent a lithium polymer accumulator with integrated electronic charging system.

The above-described accumulator unit can be connected for example by way of a USB charging cable. In that respect the force which holds the USB cable or the plug of the USB cable in the accumulator unit is greater than the force with which the accumulator unit is held in the receiving compartment of the headphones. In that respect for example the force with which the USB cable has to be pulled to remove the accumulator unit from the receiving unit can be for example between 14 N and 18 N and in particular between 14.9 N and 17.5 N. The force with which the USB plug is pulled out of the accumulator unit is in the region of between 19 N and 25 N and in particular between 21 N and 22 N.

The above-described configuration of the accumulator unit and the receiving unit of the earphones means that the accumulator unit can be easily removed from the receiving compartment simply by pulling on the inserted USB cable. That permits the accumulator unit to be easily changed.

In other words, the connecting force between the USB cable and the accumulator unit is greater than the connecting force between the accumulator unit and the housing of the earphones.

Preferably the port for receiving the USB cable can be provided with a cover.

The connection between the USB port and the accumulator unit and between the accumulator unit and the housing of the headphones can he made possible for example by means of a frictional connection instead of a latching connection.

FIG. 2C shows an accumulator unit 100 having a cap 200 and an inserted charging cable. The accumulator unit 100 has a center line 101. The plug 310 also has a center line 301. When the plug is inserted into the port 145 of the accumulator unit 100 then the center line 101 of the accumulator unit and the center line 301 of the plug of the charging cable form an angle α. The inclined configuration of the port 145 is also advantageous for pulling the accumulator unit out of the receiving compartment 410 for the accumulator unit, by means of the charging cable. The cap 200 has a pivotable cover 210 for the charging port 145. In that way the charging port can be closed and protected when the charging cable is not connected to the charging port.

Although FIGS. 2A through 2C only show a receiving compartment 410 for the accumulator unit on one side of the earphones, the earphones can also be adapted to receive a respective receiving compartment 410 on both sides. In that way it is possible for example to ensure that a replacement accumulator is present in the second receiving unit.

The inclined configuration of the charging port 145 can provide the situation shown in FIG. 2C that the center line 101 of the accumulator unit is at an angle α relative to the center line 301 of the plug of the charging cable.

Although in the foregoing embodiments it has been described that the accumulator unit and the cap 200 are in the form of two separate parts the accumulator unit can be provided with a fixed cap 200.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

The invention claimed is:
1. An accumulator unit for insertion into a portable electronic device comprising:
   a housing;
   an integrated charging unit; and
   a freely accessible charging port adapted to receive a plug of a charging cable;
   wherein the housing of the accumulator unit is of a cuboidal configuration, the housing having
      a top side;
      an underside;
      a first side wall;
      a second side wall;
      a front side; and
      a rear side;
   wherein the area of the top side and the underside is respectively at least three times as great as the area of the first or second side wall, a left-hand side wall, and/or the rear side;
   wherein the rear side has a first contact surface and a second contact surface for providing an electrical voltage at the respective ends of the rear side;
   wherein the front side has a projection having a wall arranged at an angle of between 5 and 45° relative to the rear side; and
   wherein the charging port is arranged at said wall such that a removal direction of the accumulator unit from the portable electronic device is different from a removal direction of the plug from the charging port, so that the accumulator unit is removed from the portable electronic device when a cable extending from the plug is pulled in the removal direction of the accumulator unit.
2. The accumulator unit as set forth in claim 1;
   wherein the charging port represents a standardized micro USB port.
3. The accumulator unit as set forth in claim 1;
   wherein the rear side centrally has a nose.
4. The accumulator unit as set forth in claim 1;
   wherein the top side has at least one nose serving for latching engagement of the accumulator unit in a receiving unit.

5. A portable electronic device comprising:
   a receiving compartment for receiving an accumulator unit; and
   an accumulator unit as set forth in claim 1.
6. The portable electronic device as set forth in claim 5;
   wherein the receiving compartment has electrical connections which can co-operate with electrical connections when the accumulator unit is inserted into the receiving compartment.
7. An ear phone comprising:
   an accumulator unit having:
      a housing;
      an integrated charging circuit; and
      a charging port which is freely accessible in the inserted state, and which is adapted to receive a plug of a charging cable; and
   a receiving compartment for receiving the accumulator unit;
   wherein the receiving compartment and the accumulator unit are of such a design configuration that a frictional action between the receiving compartment and the accumulator unit is less than a frictional action between a plug of a charging cable and the charging port; and
   wherein the charging port is arranged at an angle of between 5 and 45° relative to the accumulator unit such that a removal direction of the accumulator unit from the ear phone is different from a removal direction of the plug from the charging port, so that the accumulator unit is removed from the ear phone when a cable extending from the plug is pulled in the removal direction of the accumulator unit.
8. An ear phone comprising:
   an accumulator unit having:
      a housing;
      an integrated charging circuit; and
      a charging port which is freely accessible in the inserted state, and which is adapted to receive a plug of a charging cable; and
   a receiving compartment for receiving the accumulator unit;
   wherein a holding force between the receiving compartment and the accumulator unit is less than a holding force between a plug of a charging cable and the charging port; and
   wherein the charging port is arranged at an angle of between 5 and 45° relative to the accumulator unit such that a removal direction of the accumulator unit from the ear phone is different from a removal direction of the plug from the charging port, so that the accumulator unit is removed from the ear phone when a cable extending from the plug is pulled in the removal direction of the accumulator unit.
9. An ear phone comprising:
   an accumulator unit having:
      a first center line;
      a housing;
      an integrated charging circuit; and
      a charging port which is freely accessible in the inserted state, and which is adapted to receive a plug of a charging cable;
   a receiving compartment for receiving the accumulator unit; and
   a plug of a charging cable, which can be plugged into the charging port, the plug having a second center line;
   wherein an angle between the first and second center lines is between 5 and 45° such that a removal direction of the accumulator unit from the ear phone is different from a removal direction of the plug from the charging port, so that the accumulator unit is removed from the ear phone when a cable extending from the plug is pulled in the removal direction of the accumulator unit.

10. An accumulator unit for insertion into a portable electronic device comprising:
- a housing having a front side and a rear side;
- an integrated charging unit; and
- a freely accessible charging port adapted to receive a plug of a charging cable;
- wherein the rear side has a first contact surface and a second contact surface for providing an electrical voltage at the rear side;
- wherein the front side has a section arranged at an angle of between 5 and 45° relative to the rear side; and
- wherein the charging port is arranged at said section such that a removal direction of the accumulator unit from the portable electronic device is different from a removal direction of the plug from the charging port, so that the accumulator unit is removed from the portable electronic device when a cable extending from the plug is pulled in the removal direction of the accumulator unit.

* * * * *